(12) United States Patent
Spiegelman

(10) Patent No.: US 7,908,270 B2
(45) Date of Patent: Mar. 15, 2011

(54) SYSTEM AND METHOD FOR MANAGING ACCESS TO MEDIA ASSETS

(75) Inventor: Michael Spiegelman, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 370 days.

(21) Appl. No.: 11/615,571

(22) Filed: Dec. 22, 2006

(65) Prior Publication Data

US 2008/0155079 A1    Jun. 26, 2008

(51) Int. Cl.
*G06F 17/30* (2006.01)

(52) U.S. Cl. ......................................... 707/726; 707/758

(58) Field of Classification Search ...... 369/30.38–30.4; 715/202, 206, 721, 739; 707/104.1; 345/547
See application file for complete search history.

(56) References Cited

U.S. PATENT DOCUMENTS

| | | | |
|---|---|---|---|
| 5,832,499 A * | 11/1998 | Gustman | 707/103 R |
| 6,092,080 A * | 7/2000 | Gustman | 707/103 R |
| 6,353,831 B1 * | 3/2002 | Gustman | 707/103 R |
| 6,573,907 B1 * | 6/2003 | Madrane | 715/719 |
| 7,020,704 B1 * | 3/2006 | Lipscomb et al. | 709/226 |
| 7,343,414 B2 * | 3/2008 | Lipscomb et al. | 709/226 |
| 2006/0026162 A1 * | 2/2006 | Salmonsen et al. | 707/10 |
| 2006/0242550 A1 * | 10/2006 | Rahman et al. | 715/500.1 |
| 2007/0245020 A1 * | 10/2007 | Ott | 709/225 |
| 2008/0147558 A1 * | 6/2008 | Kraus | 705/59 |

* cited by examiner

*Primary Examiner* — Diane Mizrahi
(74) *Attorney, Agent, or Firm* — James J. DeCarlo; Greenberg Traurig, LLP

(57) ABSTRACT

Methods and systems for managing a library of media assets, such as songs and videos, associated with a particular user are described in this disclosure. Through the systems described, a user will have access via a network to the user's collection of media assets, as well as having local access to the same assets, regardless of where the assets actually reside on the network. Media assets, regardless of their location, may be added to the user's collection by adding them to a master list maintained by a media asset manager on a remote device. The media asset manager can then provide the user access to any listed media asset regardless of the user's location and device. The media asset manager further may update the user's local collection to reflect any changes made to the master list.

19 Claims, 5 Drawing Sheets

SYSTEM AND METHOD FOR MANAGING ACCESS TO MEDIA ASSETS

BACKGROUND

Music, video, images, sound recordings, and other renderable content are increasingly purchased and consumed in the form of media files or streaming media data through the use of electronic computing devices such as personal computers, personal data assistants (PDA), portable media players such the IPOD and ZUNE, and smart telephones. Whereas historically consumers would maintain a library of physical media assets such as vinyl records, cassette tapes, and compact discs, now consumers are increasingly storing their media assets in the form of electronic media files.

As electronic media assets have become more accepted, consumers' needs for managing and accessing their media library have changed. For example, many consumers are frustrated by the current personal computer-centric approach in which all media assets owned by a consumer must be either stored on to the consumer's personal computer. Ripping media content from physical media onto the personal computer is time-consuming. In addition, if the consumer's personal computer fails or the data is lost, then the process must be repeated. Downloading media content to the personal computer is equally time-consuming and often raises compatibility issues related to the downloaded form of the data and any digital rights management system that may be incorporated into the downloaded media content. Other systems of media asset management are similarly cumbersome and time-consuming.

Thus, modern consumers need an easy and simple way to manage their media assets.

SUMMARY

Against this backdrop systems and methods have been developed for managing a library of media assets, such as songs and videos, associated with a particular user are described in this disclosure. Through the systems described, a user will have access via a network to the user's collection of media assets, as well as having local access to the same assets, regardless of where the assets actually reside on the network. Media assets, regardless of their location, may be added to the user's collection by adding them to a master list maintained by a media asset manager on a remote device. The media asset manager can then provide the user access to any listed media asset regardless of the user's location and device. The media asset manager further may update the user's local collection to reflect any changes made to the master list.

One aspect of the present disclosure is a method of managing access to media assets. The method includes maintaining, for a user, an associated asset list. The associated asset list contains one or more cataloged asset identifiers, in which each cataloged asset identifier identifying a cataloged media asset in a library. The method further includes receiving, from the user, an association request to associate a second media asset with the user, in which the second media asset is located at a remote network location remote from the library. In response, the method determines if the second media asset is a cataloged media asset in the library based on information contained in the association request. An asset identifier is then added to the associated asset list, in which the asset identifier identifying the second media asset is chosen based on whether a copy of the media asset is contained within the library.

Another aspect of the disclosure is a system for managing access to media assets. The system includes a library of cataloged media assets. In addition, the system includes a media asset identifier module that, based on a request from a user to add a second media asset to the user's associated asset list, determines if the second media asset is a cataloged media asset in the library and generates an asset identifier for the second media asset. The system further includes an asset list manager that maintains the user's associated asset list and that adds asset identifiers received from the media asset identifier to the user's associated asset list. In addition, the asset list manager transmits the user's associated asset list to a browser on a first remote computing device associated with the user and, in response to a user render requests, causes cataloged media assets and second media assets identified by the user's associated asset list to be delivered to the first remote computing device.

Yet another aspect of the disclosure is a computer-readable medium encoding computer-executable instructions for a method of managing access to media assets. The method includes maintaining, for a user, an associated asset list. The associated asset list contains one or more cataloged asset identifiers, in which each cataloged asset identifier identifying a cataloged media asset in a library. The method further includes receiving, from the user, an association request to associate a second media asset with the user, in which the second media asset is located at a remote network location remote from the library. In response, the method determines if the second media asset is a cataloged media asset in the library based on information contained in the association request. An asset identifier is then added to the associated asset list, in which the asset identifier identifying the second media asset is chosen based on whether a copy of the media asset is contained within the library.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

Methods and systems for managing a library of media assets, such as songs and videos, associated with a particular user are described in this disclosure. Through the systems described, a user will have access via a network to the user's collection of media assets, as well as having local access to the same assets, regardless of where the assets actually reside on the network. Media assets, regardless of their location, may be added to the user's collection by adding them to a master list maintained by a media asset manager on a remote device. The media asset manager can then provide the user access to any listed media asset regardless of the user's location and device. The media asset manager further may update the user's local collection to reflect any changes made to the master list.

The systems and methods are described in terms of a distributed computing architecture in which a user's library of media assets is managed by a computing device remote from the user. For example, in an embodiment (described in greater detail below) a client-server architecture is used in which the media asset library is maintained on a remote server and accessed by the user through the means of client computing devices, such as a personal computer, smart phone, laptop computer or web-enabled portable media player. Alternative distributed computing environments are also possible. Regardless of the distributed environment, the systems and methods described herein are adapted to allow the user to add a media asset, such as a music file for example, to the user's remotely managed assets so that the user can access the media asset at a later time.

Figure 1:
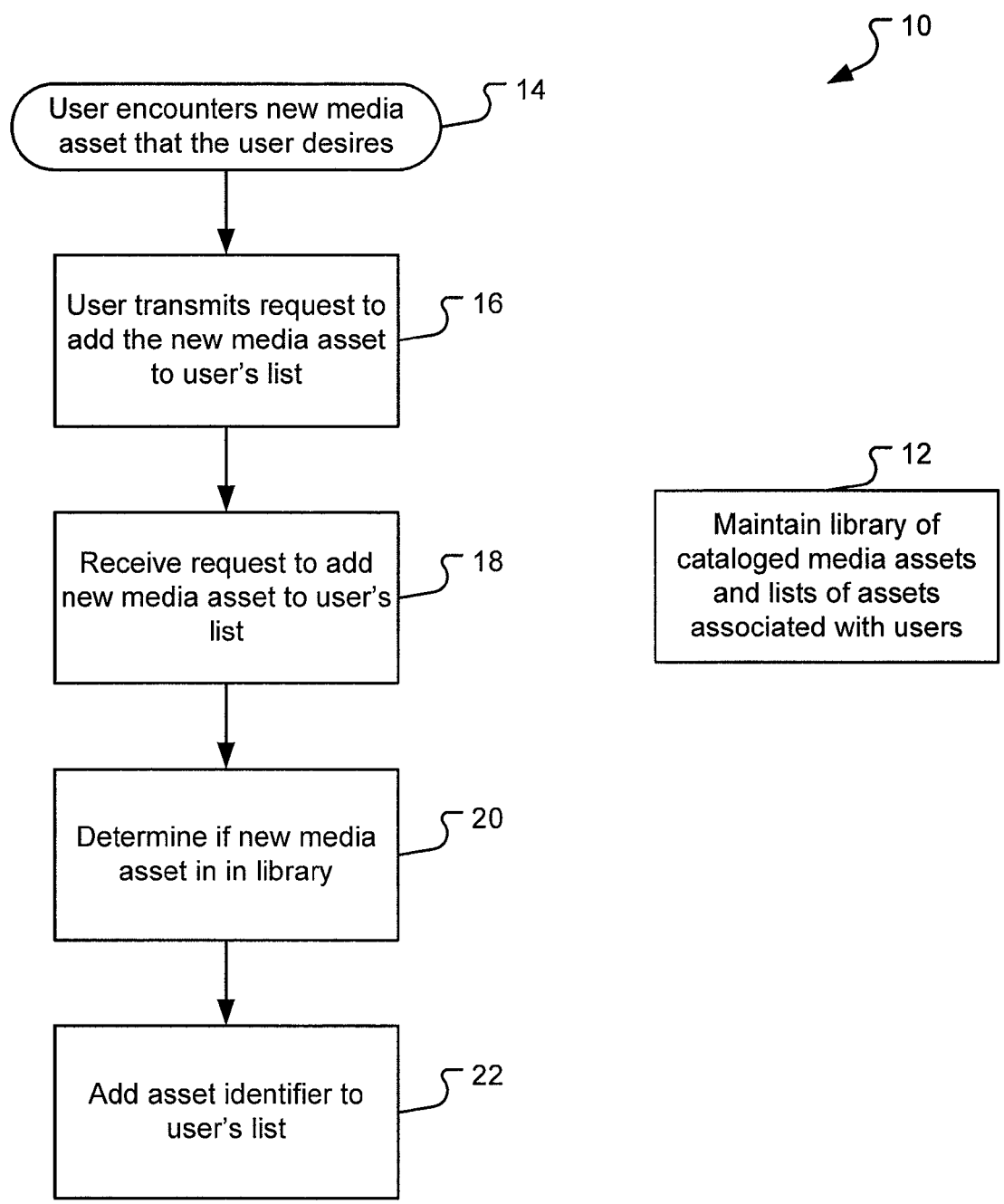
FIG. 1 illustrates a high-level embodiment of a method for managing a library of media assets.

FIG. 1 illustrates a high-level embodiment of a method for managing a library of media assets. Particularly, the method 10 is directed at a situation in which a user wishes to add a media asset to a user's list of media assets. In the method 10, a library of electronic media assets is maintained on a computing device in a maintain media asset library operation 12. In an embodiment, the computing device maintaining the library may be considered, and will be referred to as, a server computing device, or simply a "server" as it can be described as serving requests to access the library.

The library contains electronically readable media assets such as music, video, images, sound recordings, and other renderable media content. Such assets may be maintained in the form of media files that may be downloaded for storage or, alternatively, streamed to other computing devices for immediate rendering to the user of the device. In an embodiment, the library, which may also be referred to as a catalog, contains a copy of each media asset in the library. Each song in the library is provided with a unique cataloged asset identifier through which the system can identify and retrieve each media asset in the library. Additional media asset information, such as artist(s), album, title, reviews, price, cover art, genre, etc., may also be stored for each media asset in the library.

The maintain media asset library operation 12 may include periodically obtaining new media assets and adding those new assets to the library. For example, as new music is released such new songs and media content may be collected and added to the library. Such maintenance includes generating a new cataloged asset identifier for each new media asset added to the library. Similarly, the maintain media asset library operation 12 may include removing assets for which the rights to distribute have been lost.

In an embodiment, the library is maintained so that one or more users can access the system in order to render or obtain media assets. In the system, each user may be provided with a separate login and user name through which the users can independently access those media assets that they have purchased or otherwise obtained rights to. Part of the maintain library operation 12 includes maintaining user information identifying what assets each user can access, based on the past interactions of the user with the system. In some cases, a user may have access to all assets in the media library, in which case the user's media asset list may then include purchased media assets for which the user has additional download rights and/or the user's media asset list may include one or more lists of the user's favorite media assets.

For example, in an embodiment a media asset list may be maintained for each user. This media asset list, which may also be referred to as each user's "my media" list, may include a list of the cataloged asset identifiers corresponding to each media asset in the library for which the user has purchased or otherwise obtained access to in the library. Alternatively, the listed media assets may be those assets the user has decided are the user's "favorites". The media asset list for each user may include information defining multiple separate lists, such as user defined "playlists". In an embodiment, for example, a user's media asset list is a list of user selected media assets that comprise the user's favorite music.

A user's media asset list may also include multiple different types of media content such as music, movies, ringtones, blogs, news programs in audio or video form, and video episodes such as one or more seasons from a television series like the "THE WEST WING". In yet another embodiment, the systems and method s described herein could be used to provide access to recorded educational courses such as video or audio recordings of university classes. The media asset library could then also include downloadable homework assignments associated with the recorded lecture or class media asset.

In the method 10, a user encounters a media asset and desires to the have the media asset added to the user's asset list maintained by the system in an encounter media asset operation 14. In one embodiment, the user encounters the desired media asset through a web page, e.g., the media asset is displayed or otherwise accessible through a web page displayed to the user via a browser. In another embodiment, the media asset may be rendered to the user as a part of a media stream such as when listening to streaming music or video via a computing device provided by some media service. When the user encounters the media asset, the media asset is provided with at least some information allowing the asset to be identified to the system. For example, the media asset may be a file at a location on the Internet available for free download by any party. As another example, the media asset may be streamed with information, such as an artist name and title. As yet another example, the media asset may be provided with a cataloged media asset identifier that can be used by the library to identify the copy of the media asset in the library that is the desired media asset encountered by the user. The user, however, need not have any knowledge of whether the desired media asset is a cataloged media asset in the library.

The user then generates and transmits a request to the system to have the desired media asset added to the user's media list, in a generate request operation 16. The request may be generated by the user's interaction with a media player on the user's computing device or through a user's interaction with a web page, a browser or some program executing on the user's computing device. The request generated is directed at the system and contains information in a form interpretable by the system.

In an embodiment, this request may be referred to as an association request as the result of the step may be to associate the identified media asset with the user. The association request may include information identifying the user to the system. The request may be a simple GET request generated by a browser interacting with a web page or may include a series of steps and separate communications such as a login step, a search step, an asset selection step, and a final confirm transaction step.

The request may include identification information that identifies the media asset to be added to the system. In an embodiment, the request may include a media asset identifier, which may or may not be the cataloged media asset identifier discussed above. For example, in an embodiment an online retail outlet of media assets may provide the cataloged media asset identifier for the media asset as part of a transaction system. As discussed in greater detail below, when the user purchases or otherwise desires that a media asset be associated with the user the media asset transaction system provides the cataloged media asset identifier to the library with an association request.

Alternatively, the media asset identifier may be a network location, such as a Uniform Resource Locator (URL). In yet another embodiment, the request may include some identification information such as a song name, artist name, etc. from which the system may be able to identify one or more possible media assets. Regardless, the request contains some piece of information from which the media asset may be identified and accessed by the system.

In the embodiment shown, the system receives a request from a user to add a new media asset to the user's media asset list in a receive request operation 18. After the request is received, the system determines, in a determination operation 20, if the identified media asset is a cataloged media asset that is already in the library based on information contained in the association request. If the determination operation 16 determines that that the media asset is a cataloged media asset in the library with a corresponding cataloged asset identifier, the cataloged asset identifier corresponding to the media asset of the request is added as the asset identifier added to the user's associated media list in an add asset identifier operation 18. This may be a simple operation in which the cataloged media asset identifier is copied from the request to the user's asset list. Alternatively, the operation may be more complicated in which the information provided with the request must be parsed, evaluated and compared with other information available to the system before the media asset can be identified.

If the system determines that the media asset of the request is not a cataloged media asset, then the system generates another asset identifier and adds that identifier to the user's list media list. In an embodiment, a location identifier is added to the user's list as the asset identifier in the add asset identifier operation 22. The asset identifier may include the network location and any other information about the media asset available from the request. The system is capable of using the asset identifier to locate the media asset on the network. Thus, even though the asset may not be stored in the library, through the asset identifier the system is able to locate the media asset on the network and either access the asset directly or provide the location to another device so that that device may access the media asset.

Upon completion of the add asset identifier operation 22 the system now includes an updated user's asset list with the previously selected media asset identifiers and the newly added asset identifier. From a remote computing device, the user can now access the newly added media asset regardless of where that asset is located, via the user's media asset list on the server. Furthermore, the system is made more efficient by using the cataloged media asset identifier whenever it is known, so that a file from a remote location need not be accessed when attempting access the newly added media asset. This will increase the response time of the system and remove the risk that the remote network location may be in accessible for whatever reason when the user tries to access the media assets on the user's asset list.

Figure 2:
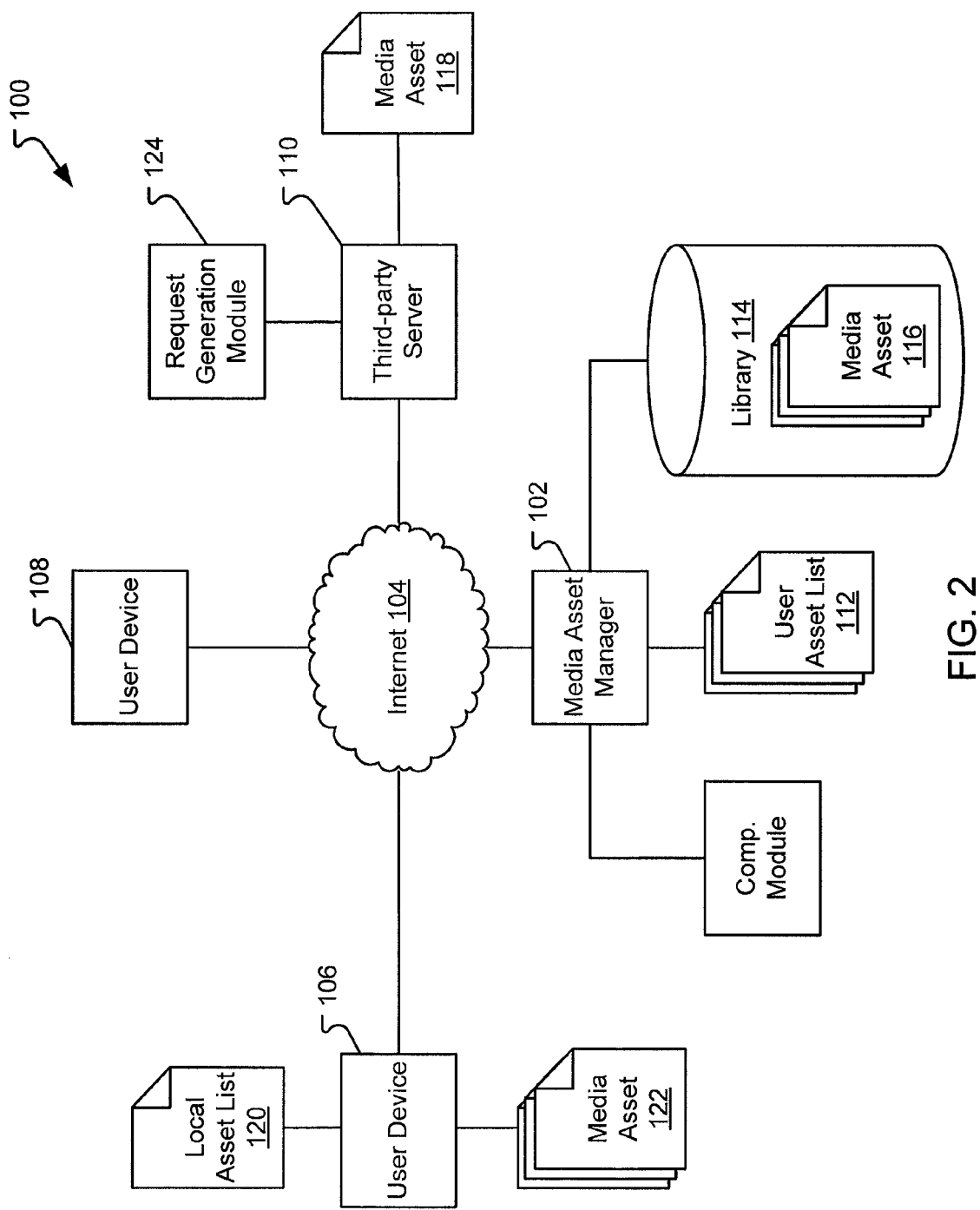
FIG. 2 is a computing architecture illustrating an embodiment of a system for managing a remote media asset list for a user.

FIG. 2 is a computing architecture illustrating an embodiment of a system for managing a remote media asset list for a user. Although numerous exemplary embodiments will be discussed in terms of media assets containing media content such as audio or video content, this system can also be utilized with any type of data that can be transmitted between computers so the term media asset should be broadly construed to encompass any type of data that can be requested and consumed by another computing device.

FIG. 2 illustrates a computing architecture 100 in which the user's computing devices 106, 110 communicate with a media asset manager 102 via a network 104 such as the Internet 104 as shown. The user's devices 106, 108 can access the media asset manager 102 to view and manage the user's list 112 of media assets 116, 118. In an embodiment, the user may also be able to cause media assets 116, 118 to be delivered to the user's devices 106, 108 from the media asset manager 102, the assets 116, 118 being either streamed or transmitted to the user's devices 116, 118.

The embodiment shown in FIG. 2 may be described in terms of a client-server architecture. In a client-server architecture, the term "client" is often used to identify a computing device that is requesting some type of service or data, e.g., requesting that a media asset be added to a list associated with a user or requesting that a media asset be delivered to the requester. The computing device that supplies the service or data is then often referred to as a server computing device, or simply as the "server." The client and server may, in fact, be identical computing devices, but are differentiated based on roles they are assuming during the particular transaction. Thus, a computing device that is a client in one transaction may simultaneously be a server in another transaction.

Examples of computing devices 102, 106, 108 suitable for use in distributed architecture are well known in the art. By way of example, computing devices such as the user's devices 106, 108 or the asset management server 102 includes a processor and memory for storing data and software. Computing devices may further be provided with operating systems and may be able execute software applications in order to manipulate, transmit and receive data. In the computing device, local files, such as the requested media file 112, may be stored on a mass storage device (not shown) that is connected to or part of any of the computing devices described herein. A mass storage device and its associated computer-readable media, provide non-volatile storage that can be accessed by one or more computing devices. Although the description of computer-readable media contained herein refers to a mass storage device, such as a hard disk or CD-ROM drive, it should be appreciated by those skilled in the art that computer-readable media can be any available media that can be accessed by a computing device.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Client-server architectures are well known in the art. Although a client, such as the user devices 106, 108, or a server may be a general purpose computing device as mentioned above, other specialized configurations may be used that increase the computing device's performance of a particular role (e.g., a client role or a server role). For example, although a client may take the form of any computing device with the appropriate communication capabilities, commonly a client is a computing device, such as a personal computer (PC), web-enabled personal data assistant (PDA), portable media player or a smart phone. A computing device may be connected to the Internet 104 via a wired data network or wireless network such as a wi-fi network, a WiMAX (802.16) network, a satellite network or cellular telephone network. A client may include a video monitor or display that can render video to a user, a speaker for playing audio to the user, a microphone for receiving the audio from the user and a camera for capturing video and images.

In the embodiment shown, a computing device may include an Internet browser, such as that offered by Microsoft Corporation under the trade name INTERNET EXPLORER, or that offered by Netscape Corp. under the trade name NETSCAPE NAVIGATOR, or the software or hardware equivalent of the aforementioned components that enable networked intercommunication between users and service providers and/or among users.

The user devices 106, 108 may also include a media engine (not shown) for rendering media assets to the user. The media engine may be a software application, a hardware component or some combination of the two that is adapted to receive and handle media data. The media engine can cause stored or streaming media data to be rendered to the user via the video display and the speaker. In addition, the media engine may also be utilized in receiving media data from the microphone and the camera for storage or transmission to another device.

A server, on the other hand, may take the form of a one or more specialized computing devices adapted to increase the server's performance in responding to requests. For example, specialized servers may be provided with multiple processors, high bandwidth input/output hardware and large amounts of local memory. In the architecture shown in FIG. 2, the various computing devices 102, 106, 108, 110 may be in different physical locations and may be separated by many thousands of miles from each other.

In the embodiment shown, the media asset manager 102 responsible for managing the library 122 and the users' asset lists 112 asset management system is illustrated as residing on a server. One skilled in the art will recognize that different functions of the media asset manager 102 may actually be distributed over several computing devices and systems. In addition, the media asset manager 102 may take the form of a single program executing on one device, or multiple programs executing on one or more devices that interact, to perform the duties and functions described.

The media asset manager 102, as described above, has access to a library 114 of cataloged media assets 116. The media asset manager 102 may actively manage the contents of the library 114, for example by adding new assets as they become available. Alternatively, the media asset library 114 may be managed by a separate and independent library 114 manager (not shown). As discussed elsewhere in this disclosure, the cataloged media assets 116 in the library may take any form include, for example, renderable media files of a known media format such as files in the Advanced Streaming Format, the Audio-Video Interleaved format, the MPEG formats, the various Windows Media formats, Apple Quicktime formats, and JPEG formants to name but a few.

The media asset manager 102 also has access to user asset lists 112. Each user asset list 112, as described above, contains information identifying one or more media assets 116 in the library 114. The user asset lists 112 may exist in the form of identifiable files or independent data structures as illustrated in FIG. 2. However, in a more common embodiment, the user asset lists 112 do not exist as independent documents, but rather are created as needed from data stored in a database of user information. For example, the media asset manager 102 may have access to a large database of user data, such as a social networking database. When a user asset list is needed, the database may be searched to obtain the necessary data and the user asset list 112 may be constructed "on the fly." Conceptually, however, this disclosure will discuss the asset list 112 in terms of an identifiable list for simplicity. The reader will recognize that, in reality, the list 112 may be stored and maintained in any form and need not be limited to an identifiable data structure such as a file.

For the purposes of this disclosure, each user asset list 112 will be described as containing a list of asset identifiers. As described above, each asset identifier is associated with a media asset 116, 118 and includes information from which the associated media asset may be located and accessed.

FIG. 2 also illustrates a third-party server 110 through which a computing device can access a media asset 118 that may or may not also be stored in the library 114 as a cataloged media asset 116. The third-party server 110 may freely allow access to the media asset 118 to any user or may only allow access based on receipt of some payment or other compensation (such as being a registered user of the third-party server 110). For example, in an embodiment, the third-party server 110 is a online retail site through which a user may purchase a copy of the media asset 118. A compensation module 126 at the media asset manager 102 is provided to track what media assets are added to the users' lists and generates bills or payments depending on pre-arranged terms. In an alternative embodiment, the third-party server may include an artist's web site through which the artist makes the media asset freely available.

Although shown with a local media asset 118, in an embodiment, the third-party server may in fact not store any media assets locally, but provide access to media assets at other locations on the network 104. For example, in an embodiment the third-party server 110 maintains only a list of media assets that are in fact stored in the library 114. When serving requests for the listed assets, the third-party server responds by directing the requester to the media asset manager 102 to obtain the requested media asset, for example by providing the cataloged asset identifier to the requester. In this way, the third-party server 110 may act as an access point for the assets 116 in the library 114, without the need to maintain any assets in local storage.

The media asset manager 102, as described above, can receive requests from users to add a media asset 116, 118 to the users' asset list 112. In response to those requests, information is stored which identifies that the desired media asset 116, 118 has been added to the users' asset list 112 and through which the users can access those media assets 116, 118 in the future. As described elsewhere, in an embodiment the media asset manager 102 will include the cataloged media asset identifier for media assets that are known to be in the library 114. In cases where it can not be confirmed that a desired asset is a cataloged media asset 116, then a location identifier or some other asset identifier will be used.

In an embodiment, the user may access the media asset manager 102 from any of the user's devices 106, 108. Such access may be supported by any known method, such as by retrieving a web page generated by the media asset manager 102 in which the web page includes user-selectable controls through which the user can interface with the media asset manager 102. In an alternative embodiment, the user's device may provide a local interface that receives user inputs which are subsequently communicated to the media asset manager 102. In any case, the interface may include displaying a personalized bar to the user that lists the media assets in the user's media asset list 120 to the user.

In an embodiment, the user's local asset list 120 may be synchronized with the user asset list 112 maintained by the asset manager 102. Synchronizing electronic information is known in art and any suitable method may be used. For example, when the user uses the device 106 accesses the media asset manager 102, such as by logging into the manager, the local asset list 120 and the user media asset list 112 may be compared (at one or the other of the devices). Any discrepancies identified may then be reconciled by either removing a listed media asset identifier or issuing an association request to the appropriate device to add the media asset identifier to the appropriate list 112, 120. For example, if a user adds a new media asset 116, 118, or 122 to the local asset list 120, upon the next time the user logs into or accesses the media asset manager 102 an association request may be received by the media asset manager 102 so that the new media asset 116, 118, or 122 is added to the user's asset list 112.

Thus, in an embodiment the media asset manager 102 allows a user to not only access the user's collection of media assets via the internet using a browser from any user device 106, 108, it also, through the synchronization with the user's devices 106, 108, updates the user's local asset list 120 so that the user need only to add a media asset once to any one of the user's asset lists 120, 112. Thus, when a user is at a third-party web site, the user may choose to add the media asset 118 to any one of the user's lists 112, 120 knowing that, ultimately, all the user's lists 112, 120 will be updated to include the newly added media asset 118. Similarly, any media asset 118, 116, 122 added from any location on the network will likewise be added to all of the user's lists 112, 120 in time.

A special case may occur if the media asset added to the local asset list 120 on a device 106 is a local media asset 122. When synchronizing the local asset list 120 with the user's asset list 112 at the media asset manager 102, the media asset manager 102 may be provided the capability of accessing the user's device 106. Thus, when the user accesses the media asset manager 102 from a different device 108, the media asset manager 102 will be able to retrieve the local media asset 122 and provide it to the different device 108.

In another embodiment, the media asset manager 102 may provide a secure storage for the user for any locally stored media assets 122 and or remote media assets 118 that are not already in the library 114. The media asset manager 102, in response to an association request for an non-cataloged media asset 118 or 122, may retrieve a copy of the asset 118, 122 from the asset's location and store it at the media asset manager 102 such that only the user can access the media interface may include displaying a personalized bar to the user that lists the media assets in the user's media asset list 120 to the user.

In an embodiment, the user's local asset list 120 may be synchronized with the user asset list 112 maintained by the asset manager 102. Synchronizing electronic information is known in art and any suitable method may be used. For example, when the user uses the device 106 accesses the media asset manager 102, such as by logging into the manager, the local asset list 120 and the user media asset list 112 may be compared (at one or the other of the devices). Any discrepancies identified may then be reconciled by either removing a listed media asset identifier or issuing an association request to the appropriate device to add the media asset identifier to the appropriate list 112, 120. For example, if a user adds a new media asset 116, 118, or 122 to the local asset list 120, upon the next time the user logs into or accesses the media asset manager 102 an association request may be received by the media asset manager 102 so that the new media asset 116, 118, or 122 is added to the user's asset list 112.

Thus, in an embodiment the media asset manager 102 allows a user to not only access the user's collection of media assets via the internet using a browser from any user device 106, 108, it also, through the synchronization with the user's devices 106, 108, updates the user's local asset list 120 so that the user need only to add a media asset once to any one of the user's asset lists 120, 112. Thus, when a user is at a third-party web site, the user may choose to add the media asset 118 to any one of the user's lists 112, 120 knowing that, ultimately, all the user's lists 112, 120 will be updated to include the newly added media asset 118. Similarly, any media asset 118, 116, 122 added from any location on the network will likewise be added to all of the user's lists 112, 120 in time.

A special case may occur if the media asset added to the local asset list 120 on a device 106 is a local media asset 122. When synchronizing the local asset list 120 with the user's asset list 112 at the media asset manager 102, the media asset manager 102 may be provided the capability of accessing the user's device 106. Thus, when the user accesses the media asset manager 102 from a different device 108, the media asset manager 102 will be able to retrieve the local media asset 122 and provide it to the different device 108.

In another embodiment, the media asset manager 102 may provide a secure storage for the user for any locally stored media assets 122 and or remote media assets 118 that are not already in the library 114. The media asset manager 102, in response to an association request for an non-cataloged media asset 118 or 122, may retrieve a copy of the asset 118, 122 from the asset's location and store it at the media asset manager 102 such that only the user can access the media asset 122. In that way, each of the user's devices 106, 108 may be able to access non-cataloged media asset 118 or 122 from the media asset manager 102. In an embodiment, such securely stored, but non-cataloged media assets, may be stored in the library 114 but provided with access restrictions that limit accessibility to the asset to the particular user.

In addition to providing a means and the information to access the media assets 116, 118 on a user's list 112, the media asset manager 102 may also interact with a third party when a media asset 118 associated with the third party is added to the user's media asset list 112 and/or the media asset 118 is accessed by the user via the media asset manager 102. For example, when a media asset 116, 118 is accessed by the media asset manager 102, a third party associated with that asset may be paid or otherwise alerted that the user is accessing the media asset.

In yet another embodiment, the media asset manager 102 may facilitate the accessibility of media assets 116 by providing third parties with the cataloged asset identifier for each of their media assets. The third party may then provide this information from the third party server 110 so that the media asset 118 may be easily correlated to a previously cataloged media asset 116 in the library 114.

This may be further facilitated by including a request generation module in the form of a script, program, or other executable application 124 on the third-party server 110. The request generation module 124 generates, for each media asset 118, an association request to add the media asset 118 to the user's asset list 112. For example, a third party could include a user-selectable button or other interface element on web page for each media asset 118. User selection of the button may then generate an association request that contains the cataloged asset identifier for corresponding the cataloged media asset 116. The user may need to log in to the system as part of processing the association request, or if the user is already logged in to the asset manager 102, the request may be processed automatically and the desired media asset 116 added to the user's list 112.

The request generation module 124 may further provide additional transaction information related to the media asset 118 that is the subject of the request. For example, the source of the request may be identified in the request, e.g., by including an identifier of the third-party server or the request generation module in the association request. This transaction information may be stored with the user's profile, such as in the user's associated asset list 112 and associated with the requested media asset identifier. Such information may then be used to track which third-party source the media asset was obtained through. The information may then be used to identify popular disseminators of media assets or to compensate third-parties that utilize the media asset manager 102 as their means for distribution of media assets.

In yet another embodiment, the request generation module 124 may be an application that is executed on a user's device 106. In this embodiment, the request generation module 124 may provide an interface, such as a tool bar, through which the user may identify a media asset on a remote server 110, 102 and, through a user input, cause the request generation module 124 to generate an association request directing the media asset manager 102 to add the identified media asset (e.g., identified by its URL) to the user's media asset list 112. In yet another embodiment, this functionality may be built into a media player on the user's device 106, 108 which is adapted to interface with the media asset manager 102.

In FIG. 2, a user's device 106 may include its own, local version of a media asset list 120. In the embodiment illustrated, one of the user's devices 106 includes a local media asset list 120. The local media asset list 120 may include the same information contained in the user asset list 112 maintained by the media asset manager 102. In an alternative embodiment, the local asset list 120 lists the same media assets but may contain less or more information as necessary for the user's device 106 to access the media assets listed. For example, if the user's device 106 includes locally stored media assets 122, then the local asset list 120 may include local file identifiers for any locally stored assets 122.

Figure 3:
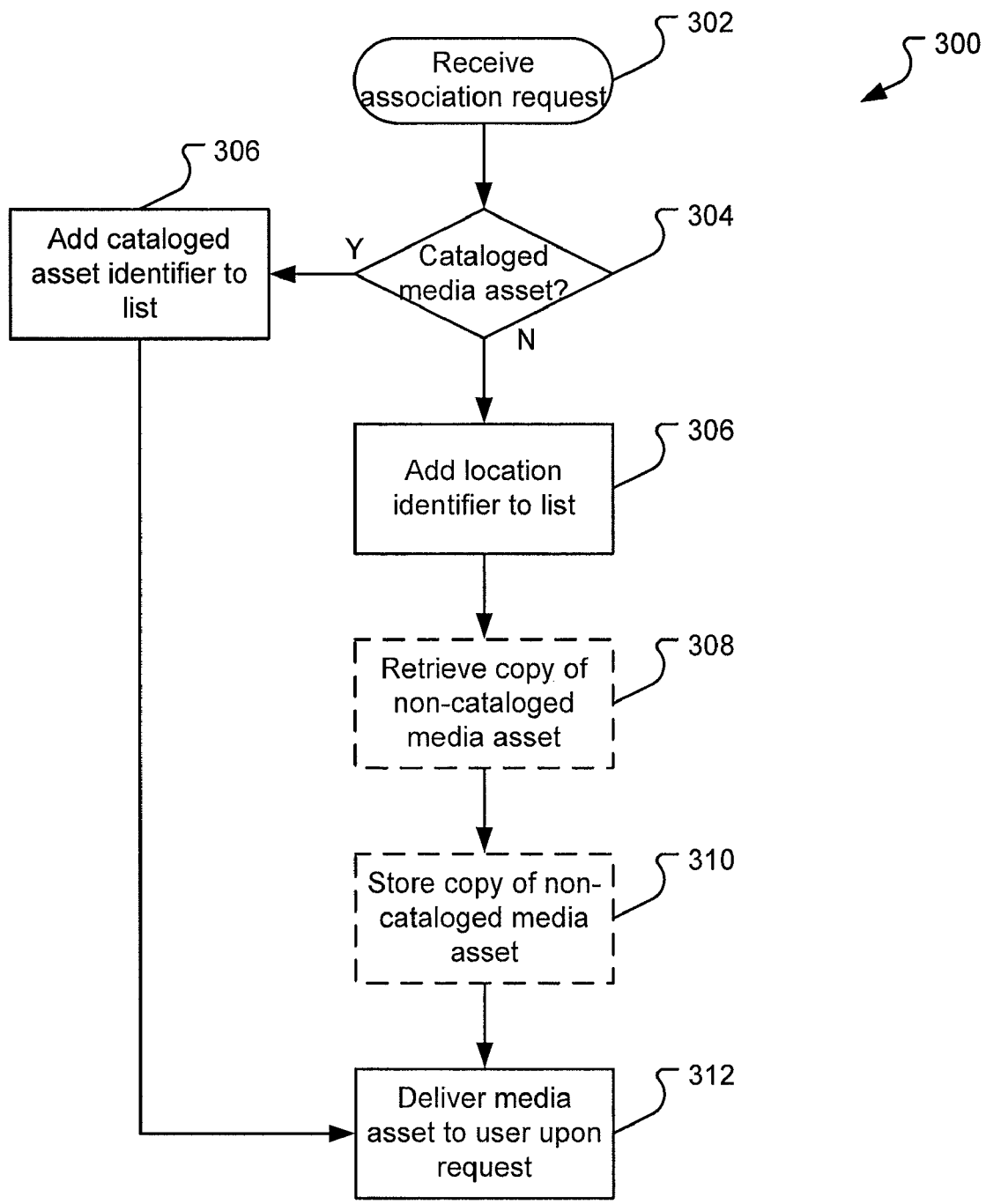
FIG. 3 is a flowchart of an embodiment of a method for managing a library of media assets.

FIG. 3 is a flowchart of an embodiment of a method for managing a library of media assets. In the method 300, a user's device, such as the user's devices 106, 108 in FIG. 2, includes its own, local version of a media asset list. In the embodiment, a media asset manager receives an association request in a receive request operation 302. The request may be received through the media asset manager's interface, such as that shown in FIG. 5, or may be generated by a request generation module as described above. The association request identifies a media asset that the user wishes to add to a list of the user's assets. The list may represent the user's favorite assets, a subset of the user's assets (e.g., favorite bluegrass music or favorite music videos), represent the user's complete collection of assets that the user likes, or be a list of the user's purchased media. The request may include information that identifies the media asset to be added, the user, and the list if there is more that one list associated with the user. Thus, in an embodiment, all the necessary information may be contained in the request. Alternatively, the receive request operation 302 may include independent sub steps of requesting each of these pieces of information, as well as any other information such as login name and password, explicitly from the user.

The media asset manager determines if the media asset identified by the request is a cataloged media asset in a determination operation 304. In an embodiment, this may include determining if the media asset identifier in the request is, or corresponds to, a cataloged media asset identifier. In an alternative embodiment, this may include comparing artist name, title, album or other metadata describing the media asset with the metadata maintained in the library about each cataloged media asset. Other way of determining if an identified media asset corresponds assets already contained in a database are known in the art and any suitable method, now known or later developed may be used.

If the media asset is an asset that already exists in the library, then the cataloged asset identifier is added to user's list maintained by the media asset manager in an add cataloged asset identifier operation 306. Thus, when the user attempts to access the newly added media asset, instead of accessing the copy identified by the request, the user will actually access the copy of the media asset in the library. This reduces the access time and further eliminates any dependency on the availability of the identified copy of the media asset from a remote location.

If the media asset is not contained in the library or it can not be confirmed that the asset is contained in the library, a location identifier is added to the user's list in an add location identifier operation 308. The operation 308 may include adding the location provided in the request or generating a location identifier based on the location provided. The information added to the list may also include metadata such as asset artist, asset name, etc. In addition, the user may be prompted to provide additional data for the list to assist in the addition of the new asset to the list.

In either case, i.e., after the add cataloged asset identifier operation 306 and after add location identifier operation 308, the user may now access the media asset via the user's list maintained by the media asset manager. For example, the user may subsequently log into the media asset manager via a portable device such as a smart phone and request that the newly added media asset be streamed to the device. In response, the media asset manager either retrieves the media asset from the library, if it is a cataloged asset. If it is not a cataloged asset, the media asset manager retrieves the asset from, or otherwise redirects the streaming request to, the location identified by the association request. In either case causing the listed media asset to be delivered to the user's device. Subsequent delivery of the media asset to the user in response to future play requests is illustrated by the delivery operation 312.

In the embodiment shown in FIG. 3 additional optional operations are illustrated by dashed lines in which the media asset manager retrieves a copy of a non-cataloged media asset from the location identified for the asset in a retrieval operation 308. The asset may then be stored so that only the user may access the asset in a storage operation 310. These operation 308, 310 are optional as there are significant copyright concerns related to the storage of copies of media assets. Depending on the ability of the media asset manager and the user to deal with these copyright issues, the optional operations 308, 310 may be eliminated.

Figure 4:
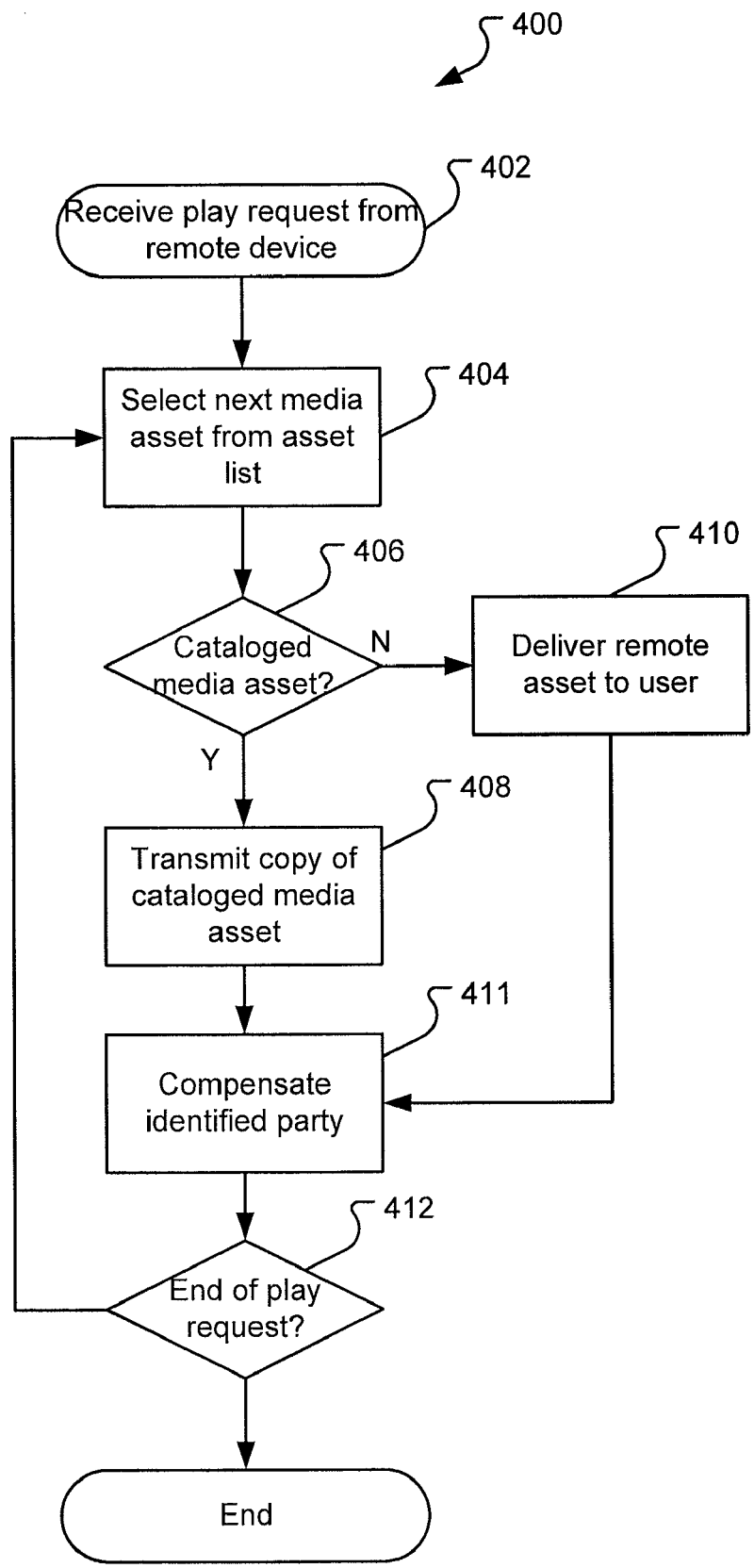
FIG. 4 illustrates an embodiment of a method for responding to play requests for assets in a remote asset list as described in FIG. 2.

FIG. 4 illustrates an embodiment of a method for responding to play requests for assets in a remote asset list as described in FIG. 2. In the method 400, a user request to play media assets on a user's list or otherwise have assets delivered to a remote device for consumption is received in a receive play request operation 402. The request for the media asset may be received directly from the user's remote device.

Based on the request, the media asset system selects the next media asset to be delivered to the user's remote device in the user's list in a selection operation 404. A determination operation 406 determines if the next asset is a cataloged asset. If the next asset is a cataloged asset, regardless of how the asset was added to the user's list in the first place or where the asset was on the network when it was added, the corresponding cataloged media asset is retrieved and delivered to the user in a transmit cataloged asset operation 408. If the asset is not a cataloged asset, the media asset manager retrieves the asset from, or otherwise redirects the streaming request to, the location identified by the list for the asset in a deliver selected media asset operation 410. For example, in an embodiment, the user's device may be directed to retrieve the media asset from the location identified in the list. In an alternative embodiment, the media asset manager may retrieve and delivery the media asset from the location.

In either case, after the media asset has been delivered to the user's device, a compensation operation 411 may be performed if the delivered asset is associated with a party and a compensation agreement. In an embodiment, as discussed above a media asset provider may be compensated each time a media asset is delivered to a user through the media asset manager. The compensation may be monetary, or may consist simply of information that the user has rendered the media asset. The compensation may further include information about the user or information related to the user's demographic or social network.

After the compensation operation 411, a second determination operation 412 determines if there are any remaining assets to be delivered to the user based on the user's request. If there are no further media assets to be delivered, the method 400 ends. If there are additional assets to be delivered, then the select next asset operation 404 is repeated and the method 400 continues as described.

Figure 5:
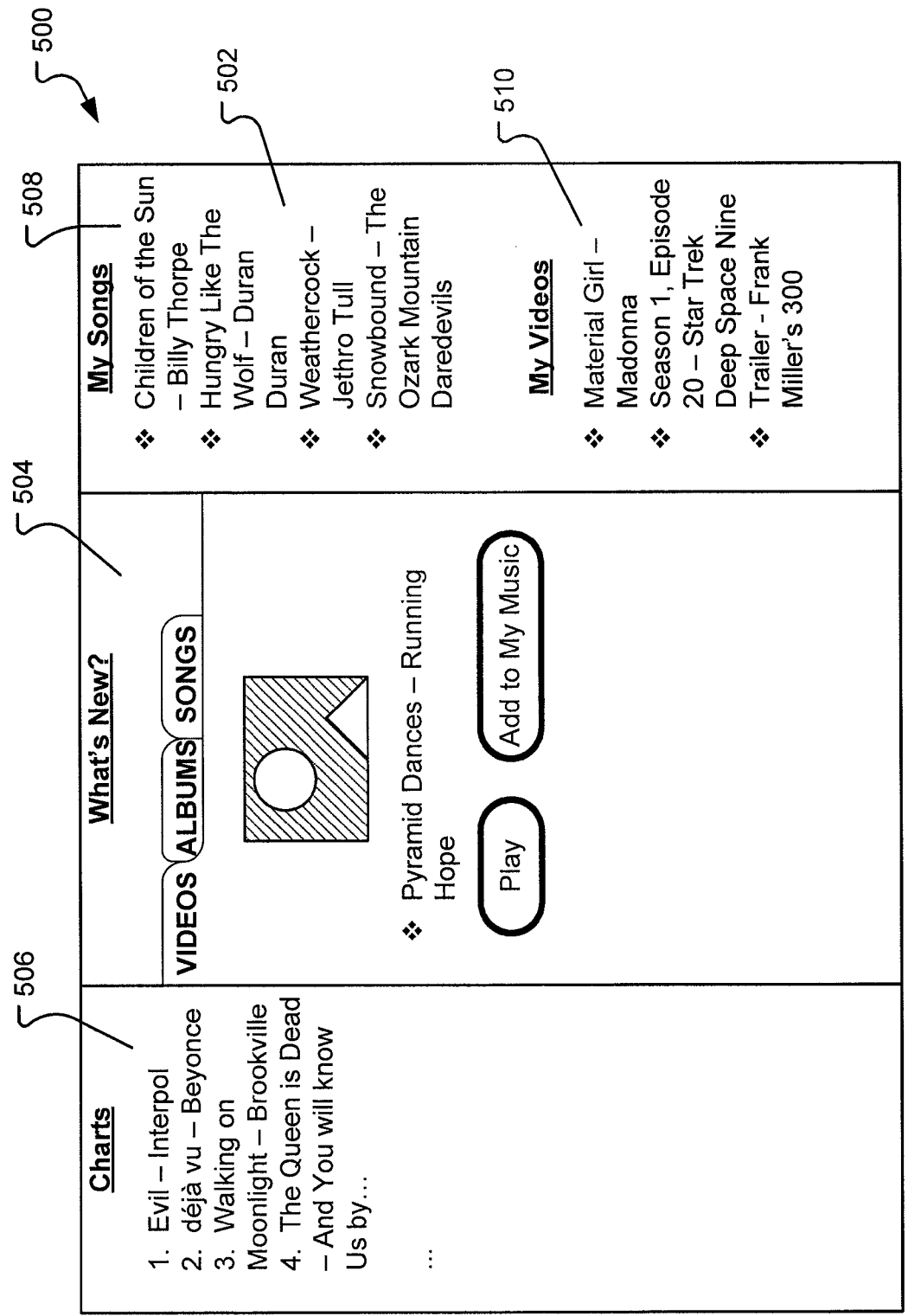
FIG. 5 illustrates an embodiment of graphical user interface presented by a media asset manager to a user.

FIG. 5 illustrates an embodiment of graphical user interface presented by a media asset manager to a user. In the embodiment shown, the graphical user interface (GUI) 500 is a rendered web page served by the media asset manager and displayed on a user's device. The GUI 500 may be displayed within a browser window (not shown) that includes the typical browser navigation and control tool bars (not shown). The GUI 500 includes several display areas 502, 504, 505. In a first display area 502, a my songs list 508 and a my videos list 510 are shown. Each list 508, 510 is a user's media asset list maintained by the media asset manager. Through the interface, the user can see and select media assets from the lists 508, 510 to be rendered. The lists 508, 510 display metadata, e.g., title and artist, for each media asset listed. Associated with the metadata for each asset, but not shown in this embodiment, is a location identifier for each media asset in the list. As described above, if the media asset is a cataloged asset, that location identifier may be a cataloged asset identifier or even a simple pointer to the asset in the library. If the media asset is not a cataloged asset in the library, the location identifier includes the information necessary to find and access the media asset on the network.

The GUI 500 further includes advertisements of media assets that are not on the user's lists. For example, a second area 504 includes recommendations of different new assets or assets that may not be known to the user but that the media asset manager believes may be of interest to the user based on some data, such as the user's demographic or tastes. The second 504 includes a media asset description that includes a graphic associated with the media asset, textual metadata (artist and title), and two user-selectable control elements 512, 514. One control element 512 is a play button that will cause the media asset to be delivered and rendered on the user's device. The second control element 514 is an add to my music button that will cause the media asset to be added to the user's list 508 or 510. As the GUI is presented by the media asset manager, the asset displayed is likely to be maintained in the library, therefore selection of the second add to my music button control element 514 will cause the cataloged asset identifier and the appropriate metadata related to the media asset to be added to the appropriate user's list, both at the media asset manager and on the local user's device through later synchronization as described above. The remaining display area 506 illustrates a list of currently popular media assets.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present invention. For example, when receiving requests to deliver media assets to a device, the system may first check to see if there is a local copy of the asset on the device, rather than retrieving and transmitting a copy from the library every time. Numerous other changes may be made which will readily suggest themselves to those skilled in the art and which are encompassed in the spirit of the invention disclosed and as defined in the appended claims.

What is claimed is:
1. A method comprising:
  maintaining on a computing device on a network, an associated asset list, the associated asset list associated with and specific to a user, the associated asset list containing one or more cataloged asset identifiers, each cataloged asset identifier identifying a cataloged media asset in a library;

receiving, from the user over the network, an association request to associate a second media asset with the user, the second media asset located at a remote network location remote from the library;

determining whether the second media asset is a cataloged media asset in the library on the network, said determination based upon information contained in the association request received from the user and the user specific asset list; and adding an asset identifier to the associated asset list based on said determination, the asset identifier identifying the second media asset.

2. The method of claim 1 further comprising:

transmitting the associated asset list to a browser on the first remote computing device, wherein the user can render, via the browser from the first remote computing device, any cataloged media asset and second media asset identified in the user's associated asset list based on the information provided in the associated asset list.

3. The method of claim 1 further comprising:

determining that the second media asset is a cataloged media asset in the library with a corresponding cataloged asset identifier; and using the cataloged asset identifier corresponding to the second media asset as the asset identifier added to the user's associated asset list.

4. The method of claim 1 further comprising:

determining that the second media asset is not a cataloged media asset; and using a location identifier as the asset identifier, the location identifier identifying the remote network location from which the second media asset can be obtained.

5. The method of claim 4 wherein the location identifier is contained in the association request.

6. The method of claim 1 wherein said receiving an association request further comprises:

synchronizing a remote asset list with the associated asset list, the remote asset list associated with the user and maintained on a device remote from the associated asset list; and determining, based on the synchronizing, that the second media asset has been added by the user to the remote asset list.

7. The method of claim 3 wherein the association request includes a cataloged asset identifier for the second media asset.

8. The method of claim 1 further comprising:

receiving a play request from a first remote computing device associated with the user; and selecting, based on the user's associated asset list, the second media asset to be transmitted to the first remote computing device.

9. The method of claim 8 wherein the play request is generated by a browser on the first remote computing device.

10. The method of claim 8 further comprising:

causing the second media asset to be transmitted from the network location from which the second media asset can be obtained to the first remote computing device.

11. The method of claim 10 wherein said causing further comprises:

retrieving, the second media asset from the network location from which the second media asset can be obtained; and transmitting the second media asset to the first remote computing device.

12. The method of claim 11 wherein the network location is a second remote computing device associated with the user and retrieving comprises:

accessing the second remote computing device; and retrieving the second media asset from the second remote computing device.

13. The method of claim 11 wherein said transmitting further comprises:

streaming the second media asset to the remote computing device associated with the user.

14. The method of claim 1 wherein said receiving further comprises:

receiving the association request from a request generation module on a remote computing device associated with the second media asset; and associating, with the asset identifier of the second media asset added to the user's associated asset list, a source identifier identifying the request generation module.

15. The method of claim 14 further comprising:

compensating a party associated with the request generation module.

16. The method of claim 15 further comprising:

providing a module for generating association requests to the party.

17. The method of claim 1 further comprising:

synchronizing the remote asset list with the associated asset list, the remote asset list associated with the user and maintained on a device remote from the associated asset list;

determining, based on the synchronizing, that the second media asset has not been added by the user to the remote asset list; and adding the asset identifier of the second media asset to the remote asset list.

18. The method of claim 17 wherein the second media asset is a cataloged media asset and adding the asset identifier of the second media asset to the remote asset list further comprises:

using the cataloged asset identifier for the second media asset as the asset identifier added to the remote asset list; and transmitting the copy of the second media asset obtained from the library to the device remote from the associated asset list.

19. The method of claim 1 further comprising:

retrieving the second media asset based on information provided in the association request when the second media asset is not contained in the library; and preventing access to the second media asset by any party other than the user.

* * * * *